Aug. 19, 1969　　　　G. BEDETTI　　　　3,462,250
PROCESS AND APPARATUS FOR THE PARTIAL COMBUSTION OF LIQUID
HYDROCARBONS TO GASEOUS MIXTURES CONTAINING HYDROGEN
AND CARBON MONOXIDE
Filed July 2, 1965

United States Patent Office 3,462,250
Patented Aug. 19, 1969

3,462,250
PROCESS AND APPARATUS FOR THE PARTIAL COMBUSTION OF LIQUID HYDROCARBONS TO GASEOUS MIXTURES CONTAINING HYDROGEN AND CARBON MONOXIDE
Gianfranco Bedetti, Milan, Italy, assignor to Montecatini Edison S.p.A., Milan, Italy, a corporation of Italy
Filed July 2, 1965, Ser. No. 469,183
Claims priority, application Italy, July 7, 1964, 14,986/64
Int. Cl. C01b 2/14
U.S. Cl. 48—95    6 Claims

ABSTRACT OF THE DISCLOSURE

Process and apparatus for the production of gaseous mixtures containing hydrogen and carbon monoxide by partial combustion at high pressures of a liquid hydrocarbon with a process gas consisting essentially of an oxygen containing gaseous oxidizer with an addition of steam. The process comprises separately introducing the liquid hydrocarbon fuel and the process gas into a reaction chamber, accelerating the process gas immediately before said introduction into the reaction chamber and impinging the process gas at high velocity upon the liquid fuel immediately after introduction of the liquid into the chamber as a continuous film whereby the liquid film is atomized by the high velocity process gas stream.

My invention relates to a process and apparatus for producing gas mixtures containing hydrogen and carbon monoxide by partial combustion of liquid hydrocarbons with a gaseous oxidizer, to which steam may be added. In this process and apparatus both the liquid fuel and the gaseous oxidizer are introduced separately into a reaction vessel with the intimate mixing necessary for the combustion process occurring within the reaction vessel itself. The process to which the invention relates is, therefore, of the so-called diffusion type, as distinguished from a pre-mixing process.

The term gaseous oxidizer is here intended to define oxygen or oxygen plus inert gases (e.g. air, oxygen-enriched air, pure oxygen and mixtures of these gases with steam).

The liquid hydrocarbon may consist of crude oil and/or its distillation and cracking products ranging from the lighter to the heavier fractions.

The liquid fuel is usually atomized or nebulized by means of liquid pressure atomizers or steam atomizers, before mixing, within the reaction vessel, with the gaseous oxidizer, which is fed at a low velocity into the said vessel in the proximity of the zone of introduction of the nebulized fuel. That is, conventionally the liquid fuel is nebulized followed by mixing and combustion with the gaseous oxidizer, fed at a low velocity. These conventional methods were suggested by the technique of the combustion with air in furnaces, in which, however, the conditions within the combustion vessel widely differ from those existing in partial combustion reaction vessel for the production of hydrogen- and carbon monoxide-containing gases.

The requirements concerning the flame stability and the attachment of the flame, which, the fuel being the same, depend chiefly on the nature and amount of gaseous oxidizer, on the composition outside the flame zone, on the temperature of the walls of the reaction chamber, are not identical in the two cases under consideration; to the contrary they are very different. As a consequence, partial combustion for the production of hydrogen- and carbon monoxide-containing gases can be carried out in a manner differing from those suggested by the conventional combustion technique.

More particularly, in reaction chambers for the production of hydrogen- and carbon monoxide-containing gases, contrary to that which takes place in conventional air furnaces, it is possible to obtain a flame, or combustion zone which is perfectly attached to the combustion apparatus, namely at the beginning of the mixing zone, even when the gaseous oxidizer has, in the inlet section of the reaction chamber, a very high velocity, above 400 m./sec.

On the other hand, it is known that in a process for nebulizing a liquid by a gas stream, which is the best of all processes when the gas velocity is sufficiently high, the degree of nebulization of the liquid increases not only with increasing velocity but also increasing amounts of nebulizing gas. It is also known that an increase in degree of atomization of the liquid fuel, corresponds to an increase in the efficiency of the plant producing hydrogen- and carbon monoxide-containing gases, because both the amount of carbon black formed is lower and the yield of the gasification process is, consequently, higher.

The present invention has as an object utilizing the gaseous oxidizer feed as a high velocity atomizing agent with the consequent advantage of carrying out an atomization process at a high ratio of (atomizing agent) to (liquid fuel) thereby avoiding the process of atomization of the liquid before contacting the gaseous oxidizer, and all the drawbacks connected thereto.

According to my invention, all of the gaseous oxidizer is accelerated immediately before the introduction into the reaction chamber, and is therein injected at a high velocity against the liquid fuel stream which, immediately after introduction into the chamber, is suitably distributed in the form of a continuous film, i.e., in a non-atomized state, on which the high velocity stream of gaseous oxidizer impinges. Immediately after the impingement, both the atomization and the mixing processes take place simultaneously along with consequent combustion.

The liquid, non-atomized fuel can be brought into contact with the high velocity stream of gaseous oxidizer in various ways, e.g. by means of a device provided with holes or openings for the introduction of the liquid or by means of the filming device illustrated hereinbelow.

My invention also has as an object apparatus suitable for carrying out the process described above. The apparatus consists of a reaction chamber wherein the high velocity stream of gaseous oxidizer is introduced through an annular opening forming the end section of an annular expansion nozzle. The gaseous oxidizer, fed from a chamber of the combustion apparatus, is subjected in the expansion nozzle to a pressure drop and to a consequent increase in velocity, suitable for atomizing or nebulizing one or more jets of liquid fuel upon which the high velocity gas stream impinges immediately downstream of the opening for the introduction of the liquid into the reaction chamber.

An example of a particularly advantageous application of said apparatus, which is not to be intended as limitative, will be described in order to illustrate more clearly the object of the invention.

Figure 1:
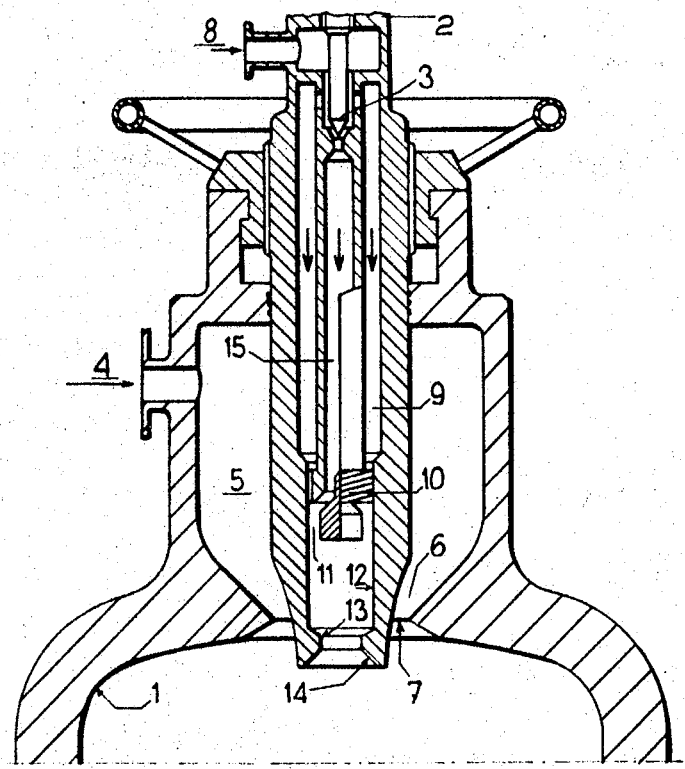
FIG. 1 represents a cross-section of the apparatus.
Figure 2:
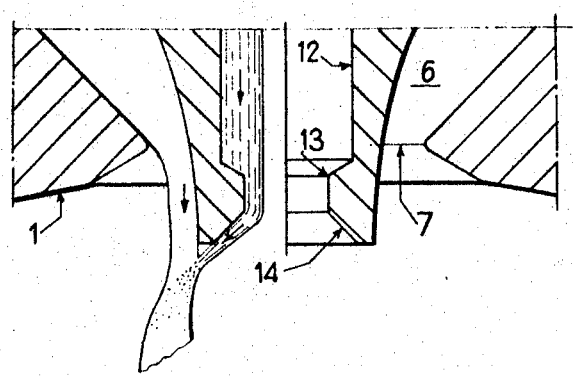
FIG. 2 shows the central body of FIG. 1 in greater detail and, schematically, both the stream of gaseous oxidizer and the stream of liquid fuel.

In the drawings, 1 is the reaction chamber, into which, through annular opening 7 the gaseous oxidizer is introduced. The gaseous oxidizer has obtained a high velocity in expansion nozzle 6, wherein the pressure falls from the value existing in chamber 5, to the value existing in reaction chamber 1. The ratio between these two pressures is the expansion ratio. Chamber 5 is provided with opening 4, for feeding the pre-mixed gaseous oxidizer, when it consists of several gaseous fluids, or with multiple feed openings, such as 4, for the gases forming the gaseous oxidizer, in case it is desired that the mixing take place inside chamber 5. Annular opening 7 has its inner circumference defined by the device for feeding the liquid fuel, which in the example now described consists essentially of a vortex chamber 12, to which the liquid is carried through the swirl device 10 in turn fed by tube 9. The swirl device imparts a rotatory movement to the liquid. The liquid thereby overflows from the circular weir 13 and licks the tip 14 of the feeding device, which is thus protected from the action of high temperature gases.

The liquid at the external perimeter of the feeding device impinges upon an annular jet of the gaseous oxidizer coming out of opening 7. The non-nebulized liquid impinges on the gaseous jet as a continuous film, which may be some tenths of a millimeter to some millimeters thick. As stated above, the outside part of said filming device constitutes the inside part of annular expansion nozzle 6.

In the apparatus of FIG. 1, there is also an adjusting device for the liquid. This makes it possible, by means of valve 3, to obtain wide variations in the flow rate of the fuel, the feeding pressure of the fuel being the same. The liquid coming out of opening 8 is divided into a stream 15 by-passing the swirl device 10 and is mixed, without undergoing any rotatory movement, with the main stream in the mixing chamber 11 feeding the vortex chamber 12. Of course, this device for adjusting and dividing the liquid stream into two streams need not be present. In this case, it is evident that all the liquid coming out of 8 is conveyed through one tube corresponding to tube 9 of FIG. 1 to the swirl device 10.

Body 2 of the device for feeding the liquid is movable in axial direction, as is shown by FIG. 1 so that, owing to the particular shape of annular expansion nozzle 6, variations of outlet cross-section 7 can be obtained. That is, nozzle 6 is an expansion nozzle having variable outlet cross-section. This possibility of movement allows controlling the velocity of the gaseous oxidizer coming out of 7, under the various loads. Consequently, the production of hydrogen- and carbon monoxide-containing gases can be under conditions of optimum yields.

In order to show the advantages of this process, two industrial applications of this invention will now be reported:

In the gasification of fuel oil through partial combustion with atmospheric air, at about 1300° C. and at 2 kg./cm$^2$., the amount of carbon black formed in the gasification process was found to be 3% of the entering carbon at an expansion ratio 1.10 and about 0.8% at an expansion ratio 1.60.

The increase of the yield corresponding to a decrease of carbon black, clearly shows the important role played by the velocity of the gaseous oxidizer impinging on the liquid fuel oil and the advantages obtainable by the use of movable body 2 (see FIG. 1), in order to compensate for the unavoidable load variations in industrial plants.

In the gasification of fuel oil by partial combustion with oxygen and steam at about 1300° C. and at about 20 kg./cm.$^2$, the decrease of carbon black formed in the gasification process, all conditions being the same with the exception of the gaseous oxidizer pressure, is such that an increase in the yield of gas $CO+H_2$ of about 3% is obtained with respect to the yield with a conventional diffusion type process, in which the liquid fuel is atomized by steam and then mixed with low rate oxygen stream.

The invention is based on these fundamental points:

In order to have a high efficiency of the plant the carbon black production must be the minimum obtainable. I achieved this by atomizing the liquid fuel properly. A good atomization requires two conditions:

(a) A large amount of atomizing gaseous fluid.

(b) A high velocity of the atomizing gaseous fluid.

In conventional burners fitted with steam atomizers, the liquid is atomized with a high velocity stream consisting of the process steam, the ratio of atomizing gaseous fluid to liquid is on the average 0.5 kg./kg. and the ratio is too low. In my burner, however, oxygen is mixed with steam and this mixture is utilized to atomize the liquid fuel. The ratio between atomizing gaseous fluid and liquid becomes 1.6 kg./kg. on the average.

Conditions (b) is satisfied by accelerating the mixture in the expansion nozzle in order to have a jet at the inlet of the reaction chamber, having a velocity usually in the range of from 200 to 500 m./sec. I eliminate the nebulization of the liquid before it is mixed with gaseous oxidizer to eliminate serious drawbacks due to the presence of the atomizer (melting, overheating of the material, clogging, etc.), although prior nebulization may also be used.

From the above mentioned points, it follows that the essential features of the process according to the present invention are:

(1) Mixing of all the process gaseous fluids (e.g. $O_2$ and steam) so as to provide a large amount of atomizing gaseous fluid.

(2) Expansion of the gaseous fluid referred to under (1), in order to produce a high velocity jet, at the inlet of the reaction chamber.

(3) Feeding of the liquid fuel up to the impinging zone in the continuous state, i.e. in the non-nebulized state.

Another important feature is:

(4) Feeding of the liquid fuel as under (3) in such a way that the terminal part of the filming device is licked by the liquid fuel.

From the above considerations, it follows that the essential features of the apparatus according to the present invention are:

(1) Expansion nozzle (for all the gaseous fluid).

(2) The filming device of the liquid which licks its terminal part and then impinges on the high velocity annular jet of the gaseous oxidizer in the continuous state, namely in the non-nebulized state.

It is further reiterated that the expansion nozzle is so shaped as to be licked by a gaseous film on the inside surface up to the contact zone with a liquid fuel. As a consequence thereof, the terminal part of the internal piece of the device is licked on both sides by fluids protecting its surfaces.

The present invention has the following advantages besides those mentioned above:

(1) Great load variations on both gas and liquid streams are possible when using apparatus as shown in FIG. 1, namely, fitted with axially movable internal body and with liquid adjusting device. The ratio between maximum and minimum load can exceed value 5/1 for large potentialities (more than 200 t./d. $NH_3$).

(2) The particular shape of the flame generated by the feeding device (burner) which is approximately cylindrical, and the stability of the flame due to the vortex motion produced therein by the momentum imparted to the entering liquid, makes possible gasification units having very large throughputs (1000 t./d. $NH_3$).

In summary, the object of the invention consists essentially of:

(a) A method for partial combustion of liquid hydrocarbons at high pressure to produce gas mixtures containing $H_2$ and CO, in which the streams of gaseous oxidizer and fuel are introduced separately into the reaction chamber, so as to obtain, immediately after the inlet of the two streams into the reaction chamber, the nebulization of the fuel by impinging the high velocity stream of gaseous oxidizer, consisting of all the process gas, onto the liquid which is fed in the continuous state, that is, non-nebulized. This method achieves the nebulization of the liquid fuel by means of a high ratio between the amounts of nebulizing gas and of liquid fuel and, furthermore, avoids the presence of conventional atomizers.

(b) An apparatus suitable for carrying out said partial combustion, formed essentially by two coaxial concentric cylindrical chambers feeding the reaction vessel. The external chamber feeds the gaseous oxidizer accelerated to a high velocity by means of the terminal throttling action. The internal chamber feeds the liquid fuel having a high tangential momentum obtained by means of a swirl device. The terminal enlargement of the internal cylindrical chamber and the rotatory movement of the liquid fuel stream are so arranged as to have the high velocity stream of gaseous oxidizer impinging on the liquid stream still in the continuous state, namely, in the non-nebulized state, that licks all the terminal surface of the internal chamber. That is, the essential elements in the apparatus are both the acceleration nozzle for the gaseous oxidizer and the shape of the overflowing surface for the liquid fuel (13 and 14 in the figures) that must lick the surface up to the impingement region with the annular jet of gaseous oxidizer.

I claim:

1. A process for the production of gaseous mixtures containing hydrogen and carbon monoxide by partial combustion at high pressures of a liquid hydrocarbon with a process gas consisting essentially of an oxygen containing gaseous oxidizer with an addition of steam which comprises separately introducing the liquid hydrocarbon fuel and the process gas into a reaction chamber, accelerating the process gas immediately before said introduction into the reaction chamber and impinging the process gas at high velocity upon the liquid fuel immediately after introduction of the liquid into the chamber as a continuous film whereby the liquid film is atomized by the high velocity process gas stream.

2. The process of claim 1, wherein the velocity of the process gas is controlled by axial motion of an internal body.

3. The process of claim 1 wherein all of the process gas is introduced into the reaction chamber by an annular expansion nozzle to form a hollow jet of a nearly cylindrical shape; feeding the liquid fuel in a nearly conical film coaxial with the annular jet of the process gas from the inside of the cylindrical jet upon which the liquid stream impinges in the form of a continuous film.

4. The process of claim 3, wherein a thin conical-shaped jet of liquid is produced by overflow from a circular weir fed by a vortex chamber with a high centrifugal field, in order to have the liquid film lick the surface of the internal device and to form a continuous film on the terminal surface thereof up to the impingement region with the annular jet of process gas.

5. The process of claim 4, in which the fuel stream is divided into two streams before entering the vortex chamber, giving the main stream a rotatory movement by means of a swirl device and mixing said stream with the other one, to which no rotation has been imparted, in a mixing chamber feeding the vortex chamber of the liquid supplying device.

6. Apparatus for producing gaseous mixture containing hydrogen and carbon monoxide by partial combustion at high pressures of a liquid hydrocarbon and a process gas comprising an oxygen-containing gaseous oxidizer with steam, which comprises two coaxial concentric cylindrical chambers, a reaction vessel downstream of said coaxial chambers and, fed thereby, the external chamber adapted to convey all the process gas and the internal chamber adapted to convey the liquid hydrocarbon, throttling means at the end of said external chamber for accelerating the process gas, swirl means for imparting a fast rotatory movement to the liquid hydrocarbon to make it form a film flowing down and licking the inner walls of said internal chamber, and a weir means and a conical enlargement at the end of said internal chamber, said end projecting into the reaction vessel beyond the annular opening of said external chamber.

References Cited

UNITED STATES PATENTS

| 2,011,034 | 8/1935 | Chilowsky | 48—212 XR |
| 2,398,654 | 4/1946 | Lubbock et al. | 48—107 XR |
| 2,916,367 | 12/1957 | Stokes | 48—107 |
| 2,971,829 | 2/1961 | Van Rossum et al. | 48—215 XR |
| 3,195,303 | 7/1965 | Widell | 239—403 XR |
| 3,286,997 | 11/1966 | Ledbetter | 239—403 XR |

MORRIS O. WOLK, Primary Examiner

R. E. SERWIN, Assistant Examiner

U.S. Cl. X.R.

48—215